(12) United States Patent
Roche et al.

(10) Patent No.: US 10,513,067 B2
(45) Date of Patent: Dec. 24, 2019

(54) METAL/COMPOSITE ASSEMBLY METHOD

(71) Applicant: INSTITUT DE RECHERCHE TECHNOLOGIQUE JULES VERNE, Bouguenais (FR)

(72) Inventors: Sylvain Roche, Varennes-Changy (FR); Francis Facon, Vernon (FR); Thierry Renault, Vernon (FR); Stéphane Auger, Château-Thébaud (FR); Christophe Cornu, Cugand (FR); Cyrille Dalla-Zuanna, Lyons (FR)

(73) Assignee: INSTITUT DE RECHERCHE TECHNOLOGIQUE JULES VERNE, Bouguenais (FR)

( * ) Notice: Subject to any disclaimer, the term of this patent is extended or adjusted under 35 U.S.C. 154(b) by 288 days.

(21) Appl. No.: 15/317,956

(22) PCT Filed: Jun. 10, 2015

(86) PCT No.: PCT/EP2015/062882
§ 371 (c)(1),
(2) Date: Mar. 26, 2017

(87) PCT Pub. No.: WO2015/189237
PCT Pub. Date: Dec. 17, 2015

(65) Prior Publication Data
US 2017/0217061 A1    Aug. 3, 2017

(30) Foreign Application Priority Data

Jun. 10, 2014   (FR) ..................................... 14 55251

(51) Int. Cl.
*B29C 45/14*      (2006.01)
*B29C 65/48*      (2006.01)
(Continued)

(52) U.S. Cl.
CPC .. *B29C 45/14311* (2013.01); *B29C 45/14467* (2013.01); *B29C 65/02* (2013.01);
(Continued)

(58) Field of Classification Search
None
See application file for complete search history.

(56) References Cited

U.S. PATENT DOCUMENTS 4,808,461 A    2/1989  Boyce et al.
5,972,524 A   10/1999  Childress
(Continued)

FOREIGN PATENT DOCUMENTS

EP    1 707 702 A2   10/2006
EP    2 669 077 A2   12/2013
(Continued)

*Primary Examiner* — Barbara J Musser
(74) *Attorney, Agent, or Firm* — Im IP Law; C. Andrew Im; Chai Im

(57) ABSTRACT

An assembly includes a first part made of composite material including a polymer matrix and a second part made of metal. The two parts are assembled by opposite or assembly faces along an interface subjected to shear loads. The first part is made of a composite having continuous reinforcing fibers in a thermoplastic matrix. The second part includes, on its assembly face, a coupling form having a plurality of patterns. Each pattern has a closed contour in a plane parallel to the assembly face of the second part and extends along a direction normal to the assembly face of the second part. A method for making such an assembly is also provided.

4 Claims, 4 Drawing Sheets

(51) Int. Cl.
- *B29C 65/64* (2006.01)
- *B29C 65/02* (2006.01)
- *B29C 65/50* (2006.01)
- *B29C 65/70* (2006.01)
- *B29C 65/72* (2006.01)
- *B29C 65/00* (2006.01)
- *B60N 2/22* (2006.01)
- *B29L 31/30* (2006.01)
- *B29L 31/00* (2006.01)

(52) U.S. Cl.
CPC ...... *B29C 65/4835* (2013.01); *B29C 65/5057* (2013.01); *B29C 65/64* (2013.01); *B29C 65/70* (2013.01); *B29C 65/72* (2013.01); *B29C 66/1122* (2013.01); *B29C 66/30321* (2013.01); *B29C 66/474* (2013.01); *B29C 66/53465* (2013.01); *B29C 66/72141* (2013.01); *B29C 66/7392* (2013.01); *B29C 66/742* (2013.01); *B29C 66/91935* (2013.01); *B60N 2/22* (2013.01); *B29C 66/54* (2013.01); *B29C 66/71* (2013.01); *B29C 66/721* (2013.01); *B29C 2045/14327* (2013.01); *B29L 2031/3002* (2013.01); *B29L 2031/3055* (2013.01); *B29L 2031/771* (2013.01)

(56) References Cited

U.S. PATENT DOCUMENTS

| | | | | |
|---|---|---|---|---|
| 2004/0028858 | A1* | 2/2004 | Schnell | B29C 65/64 428/36.9 |
| 2007/0261224 | A1* | 11/2007 | McLeod | B29C 37/0053 29/428 |
| 2015/0290903 | A1* | 10/2015 | Tresse | B29C 70/42 428/139 |
| 2015/0343742 | A1* | 12/2015 | Roemer | B32B 15/08 428/458 |

FOREIGN PATENT DOCUMENTS

| | | |
|---|---|---|
| WO | 2009/094595 A1 | 7/2009 |
| WO | 2010/101874 A1 | 9/2010 |

* cited by examiner

4A

4B

METAL/COMPOSITE ASSEMBLY METHOD

RELATED APPLICATIONS

This application is a § 371 application from PCT/EP2015/062882 filed Jun. 10, 2015, which claims priority from French Patent Application No. 14 55251 filed Jun. 10, 2014, each of which is herein incorporated by reference in its entirety.

FIELD OF THE INVENTION

The invention relates to a method and device for assembling a metal part with a composite part. The invention is more particularly but not exclusively dedicated to an assembly, using complete connection, between a support made of composite material, particularly reinforced by continuous fibers, and a functional metal part, where the assembly is subjected to shearing loads and more particularly torsion loads.

Some technical functions are difficult to achieve through the use of parts made of composite material with a polymer matrix alone. Thus, for example, articulations and balls between structural parts are preferably made in metal for reasons relating to tribology, efficiency of the articulation and resistance to the phenomena of damage to the loaded surfaces, particularly matting or scaling. Thus, metal parts must be assembled with composite structure parts.

Document WO2009/094595 describes a device for assembling a metal part with a composite part where the assembly interface is subjected to shear loads. That technical solution of the prior art uses connecting elements that protrude out from the assembly face of the metal part and penetrate into the layered structure of the composite material. These protruding elements mechanically couple the metal part with the layered structure over a depth of several plies, thus avoiding the phenomenon of peeling under the effect of interface loads. This embodiment of the prior art adapts a technique, known as Z-pinning, which consists in inserting pins made of metal or fiber perpendicular to the layers of plies, over a significant depth of the layered structure, which pins improve the resistance of said layered structure to delaminating. These are fine pins, with a length about 10 times their diameter, which are adapted to be inserted between the reinforcing fibers without deflecting them excessively; the pins must be inserted while laying up the composite part or the preform corresponding to that composite part, that is to say before the plies are impregnated with resin or before the matrix is cured/consolidated.

Connecting such pins with the metal part is complex. Thus, document U.S. Pat. No. 5,972,524 recommends inserting pins in the preform and then welding the metal part to said pins.

Documents EP1707702 and U.S. Pat. No. 4,808,461 recommend using ultrasound-assisted insertion to insert the pins in the uncured preform.

These embodiments of the prior art require a thick composite part or the use of a large number of fine pins, and are not compatible with mass production. Further, when the interface is subjected to shear loads, said pins tend to bend, so that they favor, under the shear effect, the decoupling of the two parts along a direction perpendicular to the interface. Thus, this type of assembly of the prior art frequently comprises a composite part sandwiched between two metal parts; the pins extend between them and thus make up a double interface, which increases the mass of the device.

Document WO2010/101874 describes an example of connection between a composite part and a metal part, where said assembly is part of the seat of an automotive vehicle, and is subjected to torsion loads. In this exemplary embodiment, a metal insert is incorporated while molding a part, known as the intermediate part, made of thermoplastic material. The metal insert has raised areas on some of its faces, making it easier to couple said insert and the intermediate part mechanically. Said intermediate part and the composite part are made of polymers adapted to be joined by melting so that the intermediate part, comprising the metal support, is closely joined to the composite part. The metal part is then fixed, by means of fasteners, to the metal support. The shapes of the interfaces, which are substantially U shaped, facilitate load transfers and resistance to delamination. This method, which is satisfactory in effective use and production, remains complex to implement and its advantages in terms of mass are limited because of the presence of two metal parts that extend over relatively high distances to transfer the load and keep the device safe in the event of an accident.

Document EP2669077 describes an assembly with a laminated composite part and a metal part, where the metal part is joined to the metal part when said composite part is laminated on the metal part.

OBJECT AND SUMMARY OF THE INVENTION

The invention is aimed at remedying the drawbacks of the prior art and therefore relates to a method for the structural assembly of a first part made of material comprising a polymer matrix with a second part made of metal, by setting opposite each other two surfaces known as the assembly faces, along an interface, wherein the method comprises the steps of:

a. forming on the assembly face of the metal part a form, known as the coupling form, comprising two patterns set at a distance and comprising an extension along a direction that is normal to said assembly face;

b. stamping the first part with the second part on the assembly interface when the matrix of the first part is in an unconsolidated state;

c. over molding the assembly achieved in this manner with a layer, known as the locking layer, which comprises a polymer matrix, wherein said locking layer comprises an area that overlaps the first part and an area that overlaps the second part, which oppose the relative displacement of the two parts along a direction normal to their assembly interface.

Thus, the method according to the invention is carried out economically in a manner compatible with application to mass production, by directly assembling the metal part and the composite part during a stamping operation. Over molding the locking layer prevents the two parts from coming apart along a direction perpendicular to the assembly interface, particularly when said interface is subjected to torsion loads or generally a shear load parallel to the interface. This arrangement thus makes it possible to use coupling forms that are not as extensive along the direction perpendicular to said interface compared to solutions of the Z pinning type of the prior art.

Throughout the document, unless otherwise indicated, the term "normal direction" means a normal direction turned towards the inside or outside of the material surface.

The invention can be implemented advantageously in the embodiments described below which may be considered individually or in any technically operative combination.

Advantageously, the coupling form penetrates into the first part during the stamping operation without going through said part. Thus, there is no need to make the coupling form flush with the other surface of the composite part.

In an embodiment of the method according to the invention, the step (a) comprises an operation of welding or additive machining on the assembly face of the metal part. This embodiment makes it possible to create a raised texture on the assembly face with slender patterns suitable to be inserted between the reinforcing fibers of the first part when it is of the composite type. The term "additive machining" refers to any method that makes it possible to deposit material on a substrate, particularly but not exclusively laser sintering, thermal powder spraying or laminated polymer depositing.

In another embodiment that is compatible with the previous one, step (a) of the method according to the invention comprises an operation where the metal part is cut and drawn. This embodiment is particularly advantageous in the area of manufacturing in large runs.

Advantageously, the method according to the invention comprises, before step (b), a step of:

d. placing an adhesive layer between the assembly faces of the two parts.

Thus, the adhesive helps stabilize the metal part in relation to the first part, particularly in relation to the phenomenon of the decoupling of said parts, particularly when the material making up the polymer matrix of the first part is not liable to stick to the metal making up the second part.

Advantageously, the adhesive layer is of the type that can be activated thermally and step (b) is achieved by hot stamping, where the temperature of activation of the adhesive layer is suitable for it to be activated during the hot stamping operation. Thus, the operations for gluing and stamping are combined for heightened productivity.

The invention also relates to an assembly comprising a first part made of composite material with a polymer matrix and a second metal part, assembled along the faces known as the assembly faces, opposite an interface, wherein:

i. the first part is made of a composite comprising continuous reinforcing fibers in a thermoplastic matrix;

ii. the second part comprises, on its assembly face, a coupling form comprising a plurality of patterns, wherein each pattern has a closed contour in a plane parallel to the assembly face of said part and extending along a direction normal to said assembly face, where the ratio between the extension of the pattern along a direction normal to the assembly face and the maximum diameter of the contour of said pattern in a plane parallel to the assembly face is less than 5.

The slight slenderness of the patterns of the assembly form makes it possible to make the assembly using the economical method according to the invention, with no risk of said patterns buckling during the stamping operation. Further, that slight slenderness limits the phenomenon of decoupling thanks to the transverse rigidity of said patterns when the assembly interface is subjected to shearing stress parallel to said interface.

Advantageously, the assembly face of the composite part is a flat surface. The device according to the invention thus makes it possible to make a torsion-resistant connection within a small thickness.

Advantageously, the extension of the patterns of the coupling form along a direction normal to the assembly face of the second part is less than the thickness of the first part. This configuration is more particularly adapted to the making of connections between the two parts by stamping.

In a first embodiment of the assembly according to the invention, the assembly face of the second part comprises a plurality of patterns extending towards the first part along a direction normal to said assembly face. Thus, said patterns interact with the reinforcing fibers of the first part to carry away the forces at the interface into said part.

In a second embodiment of the assembly according to the invention, which is compatible with the embodiment above, the assembly face of the second part comprises a plurality of patterns extending towards the second part along a direction normal to said assembly face. Thus, while stamping, the polymer that makes up the matrix of the first part and, where applicable, the ply of said first part that is closest to the assembly interface, penetrates into said pattern. This connection is less sensitive to the decoupling phenomenon.

Advantageously, the plurality of patterns of the assembly face includes a pattern comprising a stopping portion, which stopping portion is caught inside the composite part. Thus, said stopping portion stabilizes the assembly in relation to the decoupling phenomenon and helps transfer into the thickness of the composite part the loads normal to the interface, thus limiting punching or delaminating effects.

Advantageously, the assembly face of the second part includes a plurality of patterns comprising an opening that pierces said assembly face. These patterns make it possible to combine the benefits of the previous embodiments and can further be made using a cutting and stamping process that is particularly economical for mass production.

Advantageously, the assembly face of the second part comprises a plurality of patterns where the section in a plane parallel to the assembly face varies along a direction normal to said assembly face. Thus, specific technical functions are integrated over the length of said patterns, particularly in the case of an assembly where the plurality of patterns of the assembly face includes a pattern comprising a portion, known as the stopping portion, that is distant from the assembly interface and extends along a direction parallel to the assembly interface, which portion is adapted to create a stop along a direction normal to said interface, in cooperation with the first part. This type of pattern helps stabilize the assembly in respect of the decoupling phenomenon.

To that same end, the assembly according to the invention comprises, in an advantageous embodiment:

iii. a layer of material, known as the locking layer, comprising an area that overlaps the first part and a part that overlaps the second part.

In an advantageous embodiment, the metal part comprises means adapted to make a connection with a third part in relation to said metal part. More particularly, said means are adapted to make an indexable pivot link with said third part.

The invention also relates to a seat, particularly for a vehicle, with a mechanism comprising an assembly according to any of the preceding embodiments and alternatives. Thus, said mechanism is introduced in a composite structure, whether the composite structure is that of the seat or that of the vehicle containing said seat, by limiting the addition of mass.

Advantageously, the means for adjusting the angle of the backrest in relation to the seat according to the invention comprise an assembly according to any of the embodiments described above.

BRIEF DESCRIPTION OF THE DRAWINGS

The invention is described below in its preferred embodiments, which are not limitative in any way, and by reference to FIGS. 1 to 7, wherein.

DETAILED DESCRIPTION OF THE EMBODIMENTS

Figure 1:
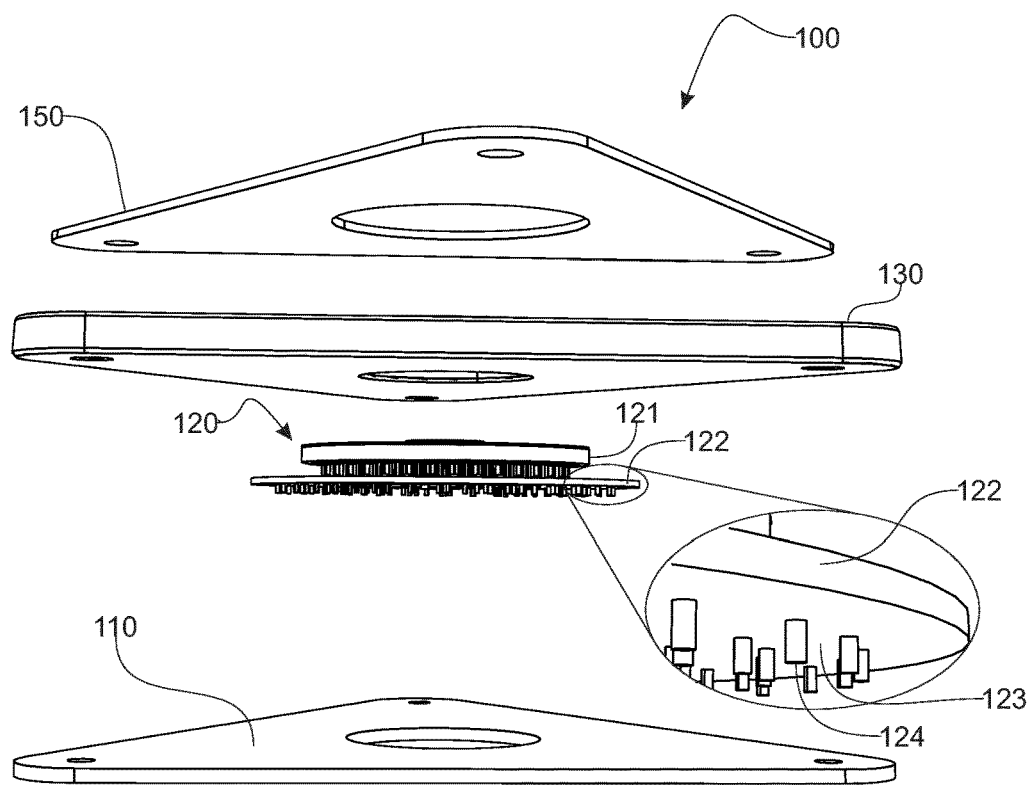
FIG. 1 is a perspective exploded view of an exemplary embodiment of an assembly according to the invention, comprising an enlarged view of the assembly face of the second part.

In FIG. 1 of an exemplary embodiment, the assembly (100) according to the invention is adapted to make an articulation between a plate (110) made of composite material with fiber reinforcement in a matrix made of thermoplastic polymer, and a bracket (150) consisting in a metal plate, for example. Said bracket is connected to the composite plate (110) through a metal part (120) that comprises a mechanical interface (121) to carry out the technical functions of articulations, such as a pivot link or angular indexing, which mechanical part is in this exemplary embodiment fixed by laser welding to a bed (122) comprising an assembly face (123) with the composite part (110). Said assembly face (123) comprises coupling forms that consist, in this exemplary embodiment, in a plurality of cylindrical spikes (124) that are substantially perpendicular to the assembly face. During the assembly process, said spikes (124) penetrate into the first part (110). A layer (130) called the locking layer, made up of material comprising a polymer matrix, is over molded on the assembly thus made. In non-limitative exemplary embodiments, the composite part (110) is made of a layered structure with plies of continuous carbon glass or polyamide fibers in a thermoplastic polyamide matrix that is typically from 3 mm to 10 mm thick.

Figure 2:
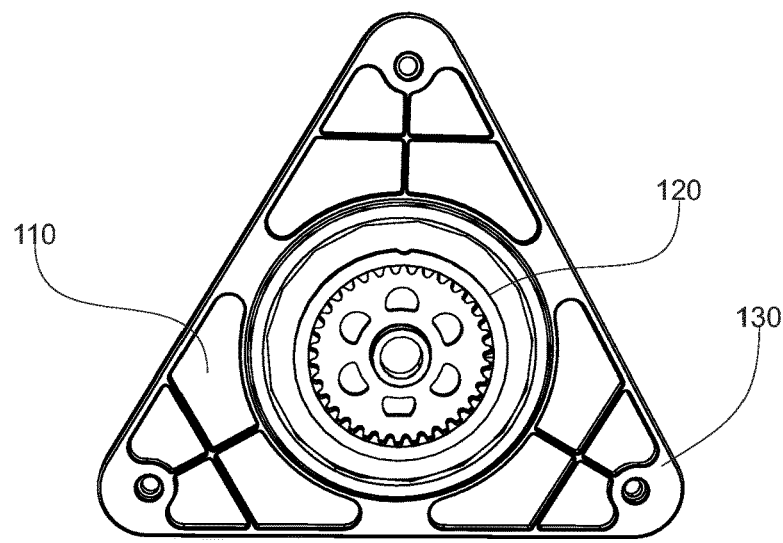
FIG. 2 shows a top view of the example of an assembly according to the invention of FIG. 1.

In FIG. 2, the locking layer (130) covers the composite part (110) and the metal part (120) outside the assembly interface of those two parts. As a non-limitative example, the locking layer (130) is made of aliphatic polyamide, commonly known by its commercial name "Nylon", comprising a charge of short glass and graphite fibers. The material is known by trade names such as "ERTALON®", "CELSTRAN®" or "AKULON®". Said layer is made by plastic injection on the assembled assembly. In an exemplary application, this assembly is suitable for making an articulation between the backrest and seat of the seat of an automotive vehicle and its total thickness is limited to 20 mm. Also in this exemplary application, said assembly is capable of withstanding torsion torque between the metal part (120) and the first composite part (110) of 3000 N·m.

Figure 3:
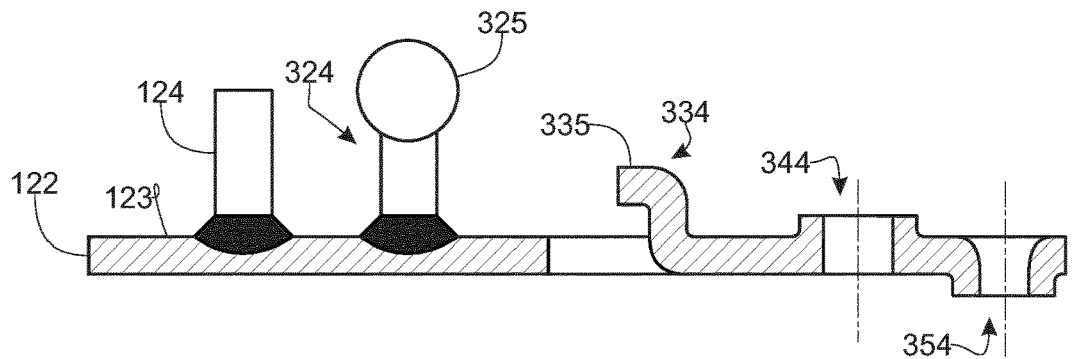
FIG. 3 is a sectional view of the different examples of patterns.

In FIG. 3, the patterns (124, 324, 334, 344, 354) that make up the coupling form of the metal part of the assembly according to the invention have a closed contour along a section parallel to the assembly face (123), that is to say the contour of the section of said pattern lies entirely within the assembly face and does not intersect the edges of that assembly face. In one embodiment, the cylindrical spike (124) is added to the steel disk (122) using a MIG-MAG type welding process named cold metal transfer or CMT, which has been described for instance in document US 2009 026188. In another exemplary embodiment, the spike (324) comprises a portion (325), here a spherical portion, that is adapted to make a stop in a direction normal to the assembly face (123). In one exemplary embodiment, said spikes (124, 334) are in steel with a diameter from 0.8 mm to 1.2 mm and height from 3 mm to 5 mm, so that the height is smaller than the thickness of the composite part. By distributing 100 to 200 spikes of that type on the assembly face (123) of a disk (122) with an 80 mm diameter, said assembly between the first composite part and the second part can withstand failure torque above 3000 N·m.

In another exemplary embodiment, the coupling form comprises a raised pattern (334) obtained by punching and bending the disk (122); in this exemplary embodiment, the pattern comprises a turned portion (335) that forms a stop when said disk (122) is assembled with the composite part. In another exemplary embodiment, the coupling form comprises a raised pattern (344) made of a hole with turned out edges. Said turned out edges are made directly during punching or by adding material using additive machining or welding.

In another exemplary embodiment, the coupling form comprises a raised pattern (354) made of a hole with turned out edges, where said turned out edges are turned towards the face opposite the assembly face (123) of the assembly disk (122). Thus, while stamping the metal part on the composite part, the matrix of the composite part is in the unconsolidated state and the polymer making up said matrix and the first ply of the layered structure are pushed into said hole (354) with turned out edges.

Figure 4:
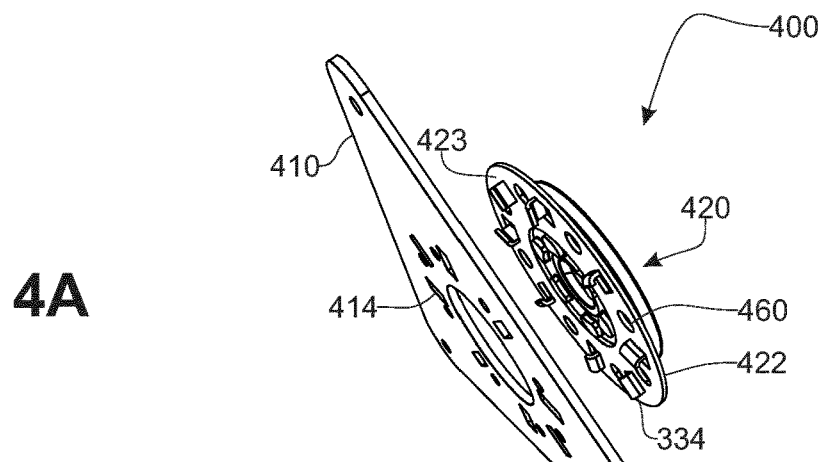
FIG. 4 is a perspective view (FIG. 4A is an exploded view and FIG. 4B is a view after assembly) of an embodiment of the assembly according to the invention, which does not necessitate the use of a stamping operation.
Figure 4:
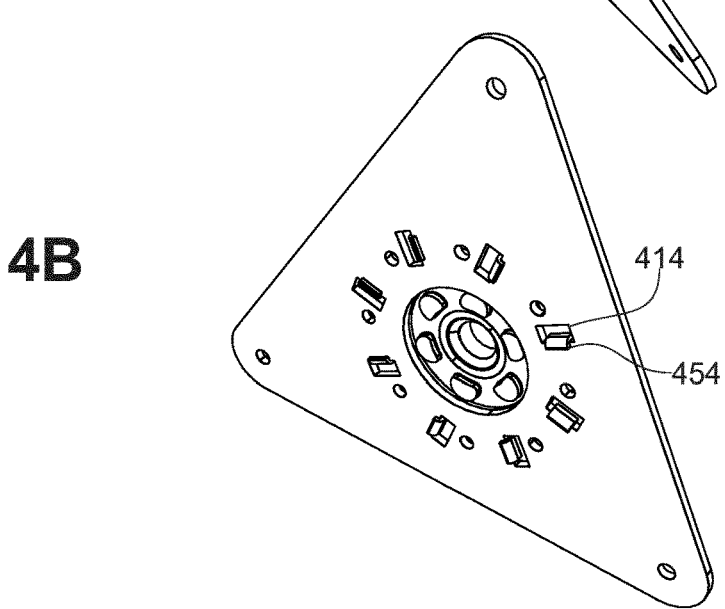

In FIG. 4, stamping is not the only means of assembling the metal part (420) with the composite part (410). Thus, in FIG. 4A of an exemplary embodiment of the assembly (400) according to the invention, the part (410) comprises holes (414) cut with a high-pressure water jet, for example. The metal part (420) comprises, on its assembly face (123), raised patterns (334) forming hooks.

In FIG. 4B, after said hook patterns (334) of the metal part (420) have been inserted in the holes (414) in the composite part, said parts are moved relative to each other over part of a turn so as to lock the hook patterns into the holes (414) in the composite part (410). Then the assembly is over molded to stabilize it.

Figure 5:
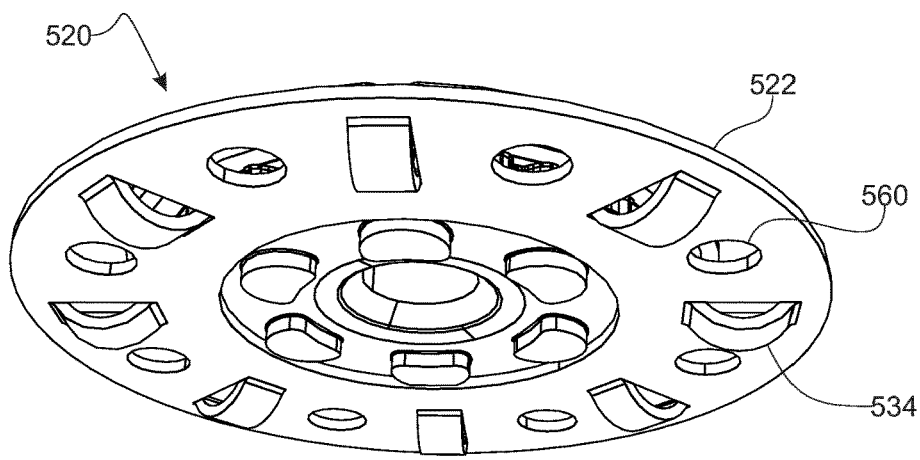
FIG. 5 is a perspective view of an exemplary embodiment of a metal part of an assembly according to the invention in an alternative embodiment for that shown in FIG. 4.

In FIG. 5 of an alternative embodiment of FIG. 4, the patterns (534) of the coupling form of the metal part (520) are made by cutting and stamping and comprise an opening that pierces the assembly disk (522) and a locking loop (535). The implementation of this embodiment is similar to that of the previous one, namely that said patterns (534) are inserted in the holes cut out in the composite part and the assembly is stabilized by over molding the locking layer.

In FIGS. 4 and 5 of these embodiments, the assembly disk (422, 522) of the metal part comprises, complementary to the raised parts (334, 534), holes (460, 560) that have been cut, by stamping for instance, into which the material forming the locking layer enters when said layer is injected.

Figure 6:
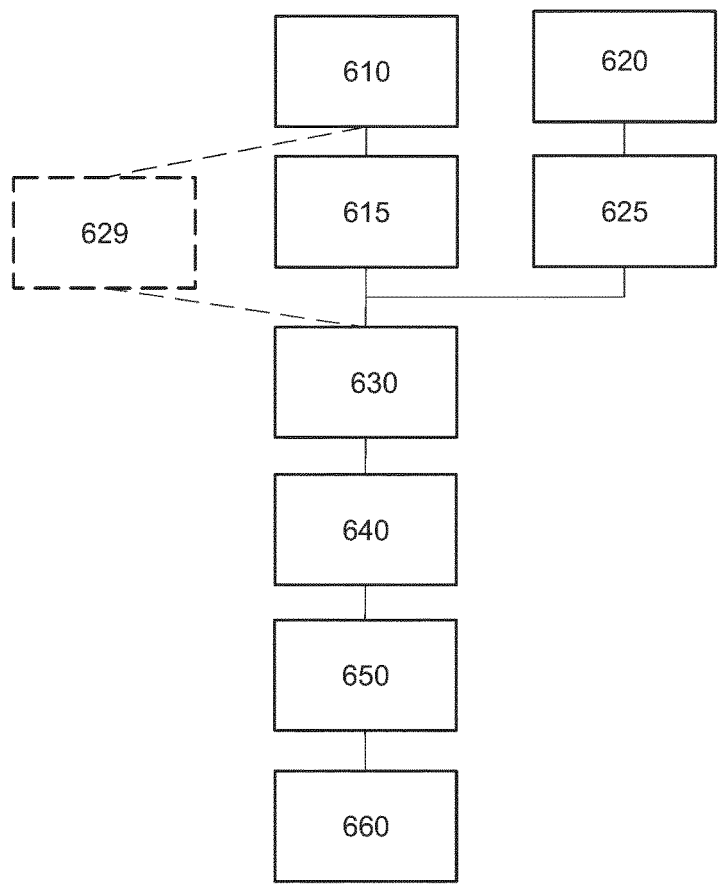
FIG. 6 is a diagram of an exemplary embodiment of the method according to the invention.

In FIG. 6, according to an exemplary embodiment of the method according to the invention, the method comprises a first machining and forming step (610) consisting in creating the coupling form on the assembly face of the metal part.

This operation may, for example, be carried out using a CMT type process, which makes it possible to weld a plurality of spikes on the assembly face of the metal part without deforming the assembly disk.

In this exemplary embodiment, the matrix of the composite material that makes up the first part of the assembly is made of thermoplastic polymer. Also, in parallel with the machining and forming step (610), during a composite manufacturing step (620), the composite part is made. In this non-limitative exemplary embodiment, said part is made by nesting and trimming with a high-pressure water jet out of a consolidated plate of a composite with a thermoplastic matrix.

During a tooling preparation step (615), the machined metal part is placed in a stamping matrix, which stamping matrix is mounted on the fixed table of a press in this exemplary embodiment. Depending on the temperature required for stamping the composite part, said matrix has a heating system using means known to those skilled in the art.

During a transfer (625) step, the composite part is placed on a transfer device that heats said part to a temperature close to the melting temperature of its polymer matrix at the same time as it is taken to the press. As a non-limitative example, the composite part is transferred to a transfer frame that holds it on its perimeter and is heated as it passes under radiant panels.

During the stamping step (630), the metal part and the composite part are assembled. To that end, the composite part is placed on the stamping die comprising the metal part, separated from its transfer frame and pressed into said die by a stamping punch with an appropriate shape. Said punch and said stamping matrix make it possible to control the shape of the composite part during that operation. When heated to a high temperature, the polymer matrix of the composite part is in a pasty state and the composite part is in a uncompacted state. Thus, localized movements between fibers are possible, as is slipping between layers over longer distance, so that the spikes of the metal part penetrate into the assembly face of the composite part without generating failure. The composite part is then cooled in the stamping die, where the punch and said die demarcate a volume that compacts said part once again. Thus, the fibers come closer to said spikes during the compacting and consolidation process.

In an optional step (629), a sheet of glue, made of epoxy resin in a non-limitative exemplary embodiment, in inserted between the metal part and the composite part before stamping. When raised to the stamping temperature, said sheet of glue firstly tends to interlace and secondly to join by diffusion with the thermoplastic matrix of the composite part and adhere to the metal part.

After unmolding, the first and second part of the assembly according to the invention are placed in a plastic injection mold. During an over molding step (640), the locking layer is injected over the assembly in the shape given to it by the injection mold.

During an unmolding step (650), after cooling, the assembly is removed from the mold and finished during a finishing step (660) that is particularly aimed at deburring the assembly and machining it if needed, with holes and trimming, in order to integrate the assembly according to the invention into a mechanical device.

Figure 7:
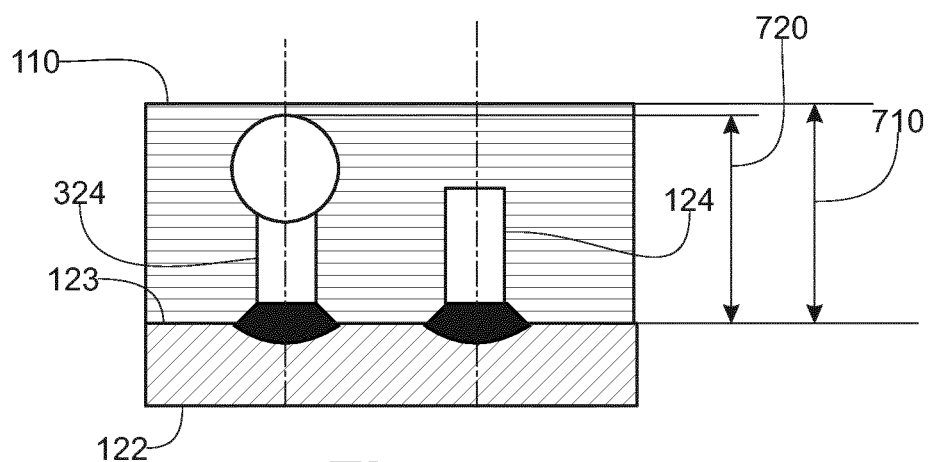
FIG. 7 is a partial sectional view showing the assembly of the composite part and the metal part after the stamping operation in an exemplary embodiment of the method according to the invention.

In FIG. 7 of an exemplary embodiment of the method according to the invention, the spikes (124, 324) of the metal part penetrate into the composite part (110) without going through it, as the extension height (720) of said spikes in relation to the direction normal to the assembly face (123) is smaller than the thickness (710) of the composite part (110). In a non-limitative embodiment, the height (720) of said spikes (124, 324) is approximately half the thickness (710) of the composite part (110).

The exemplary embodiments of the assembly according to the invention shown in FIGS. 2 and 4 are adapted to make the articulation of the backrest of the seat of an automotive vehicle in relation to the seat of said seat. This type of articulation is particularly sized using criteria relating to resistance to the torques generated during high accelerations observed in the event of an accident. Thus, each articulation of this type must withstand torque of 3000 N·m. By comparison with the solution of the prior art described in document WO 2010 101874, the assembly according to the invention allows weight savings of nearly 1 kg for the same efficiency.

The description above and the exemplary embodiments show that the invention reaches the objectives sought; in particular, it allows the assembly of two parts of different types, along a simple interface that is substantially flat and subjected to shear loads, using a manufacturing method that can be automated and is suitable for mass production. Even though an exemplary application presents the use of the assembly according to the invention for making a seat, those skilled in the art can adapt its principles to other applications with similar constraints and features.

The invention claimed is:

1. A method for a structural assembly of a first part made of material comprising a polymer matrix with a second part made of metal, by two opposite surfaces known as assembly faces, along an assembly interface, the method comprising the steps of:
    forming a coupling form on the assembly face of the second part, the coupling form comprising two patterns set at a distance and comprising an extension along a direction normal to the assembly face of the second part;
    stamping the first part with the second part on the assembly interface when a matrix of the first part is in an unconsolidated state to provide the structural assembly;
    over molding the structural assembly with a locking layer comprising a polymer matrix, wherein the locking layer comprises an area that overlaps the first part and an area that overlaps the second part, which oppose a relative displacement of the two parts along a direction normal to the assembly interface;
    before the stamping step, placing an adhesive layer between the assembly faces of the first and second parts;
    wherein the adhesive layer is thermally activatable; and
    wherein the stamping step is achieved by hot stamping which thermally activates the adhesive layer.

2. The method according to claim 1, wherein the coupling form penetrates into the first part during the stamping step without going through the first part.

3. The method according to claim 1, wherein the forming step comprises a step of welding or additive machining on the assembly face of the second part.

4. The method according to claim 1, wherein the forming step comprises a step cutting and drawing the second part.

* * * * *